J. A. MITCHELL.
Devices for Catching Fish.

No. 199,926.          Patented Feb. 5, 1878.

WITNESSES                                          INVENTOR.

UNITED STATES PATENT OFFICE.

JOHN A. MITCHELL, OF MAYSVILLE, KENTUCKY.

IMPROVEMENT IN DEVICES FOR CATCHING FISH.

Specification forming part of Letters Patent No. 199,926, dated February 5, 1878; application filed June 16, 1877.

*To all whom it may concern:*

Be it known that I, JOHN A. MITCHELL, of Maysville, in the county of Mason and State of Kentucky, have invented a new and valuable Improvement in Devices for Catching Fish; and I do hereby declare that the following is a full, clear, and exact description of the construction and operation of the same, reference being had to the annexed drawings, making a part of this specification, and to the letters and figures of reference marked thereon.

Figure 1:
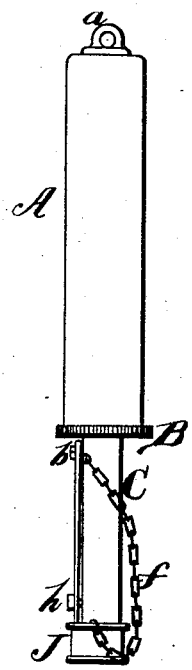
Figure 2:
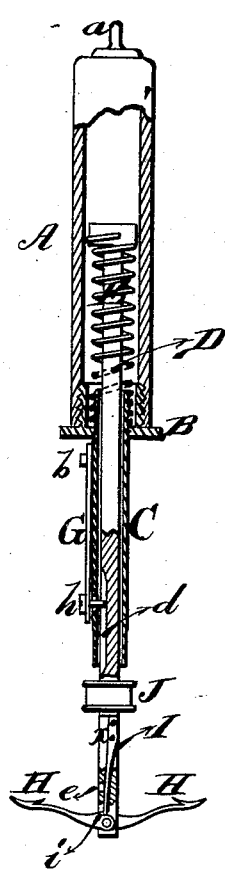
Figure 3:

Figure 1 of the drawings is a representation of my device for catching fish set ready for action. Fig. 2 is a longitudinal vertical central sectional view, and Fig. 3 is a detail of the same.

The nature of my invention consists in the construction and arrangement of a fishing-gun, as will be hereinafter more fully set forth.

The annexed drawings, to which reference is made, fully illustrate my invention.

A represents the large tube or shell which incloses the driving-spring of the fishing-gun for the purpose of keeping all dirt and other matter from the same. One end of this tube or shell is closed, and has a knob or eye, *a*, for the attachment of the line. In the other end of said shell is screwed the head B, having a tube, C, of suitable length projecting outward from it, as shown. Through this tube C and through the head B is passed a plunger, D, which extends into the shell A, and has the coiled driving-spring E placed around its inner end. One end of this spring is attached to the head B, and the other end to the end of the plunger, so that the tension of the spring will throw the plunger outward.

The plunger is guided in its inward and outward movement, so as not to turn in the tube C, by means of a screw, *b*, passed through said tube into a longitudinal groove, *d*, in the plunger. This screw fastens one end of the trigger-spring G to the outside of said tube C. The front or outer end of the plunger D is cut square or flat on opposite sides for a suitable distance, or, in other words, there is a recess, X, formed on opposite sides of the plunger. In the outer end of each recess is pivoted a hook, H, which is thrown outward by means of a spring, I, fastened at the inner end of the recess, and operating against a shoulder, *i*, at or near the inner end of the hook.

The recesses X are to allow the hooks to close up in them when they are backed into the small tube C out of sight and out of the way of the bait, giving the fish or other animal a chance to take the bait in the mouth.

In the plunger D, near the end, is formed a small cavity or recess, *e*, into which the trigger screw or pin *h* takes, to hold the plunger back when set, said screw or pin being fast in the free end of the trigger-spring G, and passing through a hole in the plunger.

J represents the bait-ring, which encircles the end of the small tube C and catches the trigger. The bait is attached to this ring in any suitable manner, and the ring is, by a cord or chain, *f*, connected with a trigger, to prevent it from slipping forward beyond the limit of such cord or chain.

L represents a pointed rod, by means of which the gun is set, in the following manner: The hooks are closed with the left hand, and the pointed end of the rod L placed in a recess in the end of the plunger D, and the plunger then pressed back until the screw or pin *h* of the trigger springs into the recess *e*. The bait-ring J is then slipped over the end of the trigger-spring, whereby the plunger is held in place, the hooks being entirely concealed within the tube C.

When the fish or other animal takes hold of the bait, and pulls the ring J off from the trigger, the driving-spring E forcibly shoots out or ejects the plunger into the mouth of the fish. The butt ends of the hooks entering the mouth first, and being forcibly thrown outward by the springs I, will catch in the mouth of the fish or animal, and utterly preclude the possibility of his escape.

On the end of the rod L is a thimble, L', which is used for the purpose of closing the hooks in taking them out of the fish's mouth.

It will be noticed that when the gun is sprung the hooks pass beyond the bait and bait-ring.

What I claim as new, and desire to secure by Letters Patent, is—

1. A device for catching fish, consisting essentially of a plunger, operated by a driving-spring, and carrying two or more hooks, thrown outward by springs, the parts being so arranged that the butt ends of the hooks will enter the mouth first, as herein set forth.

2. The combination of the spring-plunger D having recesses X, the hooks H H, and springs I, constructed and arranged as and for the purposes herein set forth.

3. The combination, with the tube C and plunger D, of the trigger-spring G, with pin or screw $h$, and the bait-ring J, for the purposes herein set forth.

4. The combination of the shell A, head B with tube C, plunger D with driving-spring E, hooks H with actuating springs I, trigger G $h$, and bait-ring J, all constructed and arranged to operate substantially as and for the purposes herein set forth.

In testimony that I claim the above I have hereunto subscribed my name in the presence of two witnesses.

JOHN A. MITCHELL.

Witnesses:
JOHN N. THOMAS,
CHARLTON B. CLIFT.